United States Patent Office.

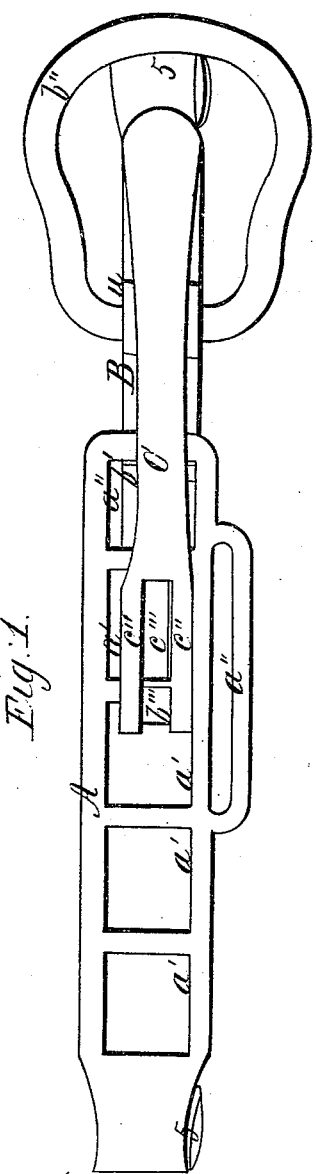
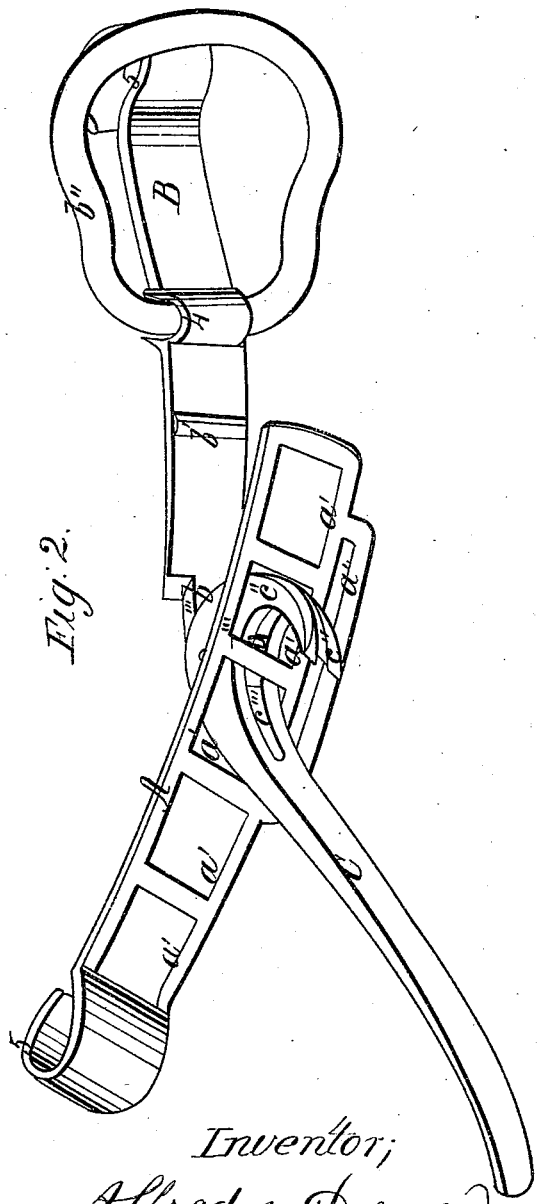

ALFRED M. DORMAN, OF PHILADELPHIA, PENNSYLVANIA.

Letters Patent No. 94,090, dated August 24, 1869; antedated August 10, 1869.

---

IMPROVED HAMES-FASTENER.

---

The Schedule referred to in these Letters Patent and making part of the same.

---

*To all whom it may concern:*

Be it known that I, ALFRED M. DORMAN, of the city of Philadelphia, in the State of Pennsylvania, have invented a new and useful Improvement in Coupling-Fastenings for Harness-Hames and other purposes; and I do hereby declare that the following is a full, clear, and exact description of the construction and operation of the same, reference being had to the accompanying drawings, making a part of this specification, in which—

Figure 1 is a plan view of the outer or under side of the said improved fastening, as coupled and fastened; and Figure 2, a perspective view of the same, as unfastened.

Like letters and numbers of reference indicate the same parts when in both figures.

My improvement relates more especially to the "hames-fastening" patented by Shalters and Catern, December 18, 1866, and has for its objects to facilitate the introduction of the hooked lever of the one bar into any one of the series of openings or "links" in the other bar; to more effectually prevent the lateral motions of the one bar upon the other, after they have been fastened together, in using; to provide a suitable device for receiving and attaching the usual martingale-strap, to keep the harness-collar down; and to provide a suitable device for receiving and attaching the usual pole-strap required for double harness.

My invention consists, substantially as hereinafter described, in so constructing the hinge-joint which connects the hooked lever and its bar together, as to avoid the offsetting shoulders, which are liable to catch against the sides of the openings or "links" in the other bar, in coupling or uncoupling the same; in providing a fixed projection across the under side of the bar that is articulated to the hooked lever, which will receive around over it any one of the series of openings in the other bar; in providing one of the said bars with a suitable loop or slot, for attaching the usual martingale-strap of the harness-collar thereto; and in providing the bar to which is articulated the hooked lever with a loose ring, for receiving one end of the usual pole-strap of the vehicle, when the said coupling-fastening is used for double harness.

Referring to the drawings—

A is the bar, having the series of openings $a'$ $a'$;

B, the bar to which the hooked lever C is articulated;

$b'$, the projection across the under side of bar B;

$a''$, the fixed loop or slot for attaching the usual martingale-strap; and $b''$, the loose ring for receiving one end of the usual pole-strap.

The hinge-joint which connects C and B together (by a pin, as usual) is produced by making the tongue $b'''$ of the hinge on the middle of the end of the bar B, and the corresponding jaws, $c''$ $c''$, of the said hinge on the end of the hooked lever C, the slot $c'''$, between, receiving the tongue $b'''$, the jaws $c''$ $c''$ being made in the hooked form, as heretofore, and shown in fig. 2, and the width of the hooked end of the lever C being made to correspond with the width of the bar B, at the parts forming the said hinged joint, while the openings $a'$ $a'$ are made a little wider than the hooked lever.

It will therefore be seen, that the said hooked lever and joint will readily pass into and out of any one of the openings $a'$, or without being obstructed in the operation by any offsetting shoulders, as heretofore.

The projection $b'$, across the under side of B, is cast on, and when the bar A projects the distance or length of two or more of the openings $a'$ therein, past the hooks $c''$ $c''$, after the two bars, A and B, are connected and fastened together on the harness-collar, the said projection, $b'$, will be in the opening $a'$ thereat, and thus effectually prevent any objectionable lateral motion of the end of the bar A upon the bar B; and, being on the under side of its bar, it does not interfere with nor injure the harness-collar.

The loop or slot $a''$ is cast on the lower or inner edge of A, so as to admit of the ready attachment thereto of the usual martingale-strap of the harness, for the purpose of holding the harness-collar down in place, which is a matter of importance, especially in double harness.

The ring $b''$ is attached in a transverse groove, 4, cast in the inner or upper side of bar B, can be vibrated freely, and affords a ready loop for attaching the usual pole-strap required in using double harness.

It also does away with the "breast-strap," heretofore used for the same purpose, and thus saves from five to ten dollars in the cost of the harness.

The outer ends, 5 5, of the two bars A and B, are cast in a hooked form, as heretofore, for attaching them to the respective parts of the hames, or other devices, to be coupled and secured adjustably together.

Having thus fully described my improvement,

What I claim as new, and desire to secure by Letters Patent, is confined to the following, viz:

1. I claim connecting the two parts, B and C, together, by means of a hinge-joint, having its tongue, $b'''$, on the part B, and its jaws $c''$ $c''$ and slot $c'''$, on the part C, and the width of the parts B and C thereat alike, substantially as described and shown, for the purpose specified.

2. The fixed projection $b'$, across the outer or under side of B, substantially as and for the purpose described.

3. The loop or slot $a''$, on the edge of bar A, substantially as and for the purpose described.

4. In combination with the bar B, I claim the loose ring $b''$, applied so as to operate substantially in the manner described, for the purpose specified.

ALFRED M. DORMAN.

Witnesses:
BENJ. MORISON,
WM. H. MORISON.